US008296207B2

(12) United States Patent  
Case et al.

(10) Patent No.: US 8,296,207 B2  
(45) Date of Patent: Oct. 23, 2012

(54) BACKWARD/FORWARD TRADING CONTRACTS BASED ON REIT-BASED PURE PROPERTY RETURN INDEXES

(75) Inventors: Bradford Case, McLean, VA (US); David Geltner, Carlisle, MA (US); Holly Horrigan, Needham, MA (US)

(73) Assignees: Massachusetts Institute of Technology, Cambridge, MA (US); National Association of Real Estate Investment Trusts, Washington, DC (US)

( * ) Notice: Subject to any disclaimer, the term of this patent is extended or adjusted under 35 U.S.C. 154(b) by 0 days.

(21) Appl. No.: 12/825,036

(22) Filed: Jun. 28, 2010

(65) Prior Publication Data

US 2011/0320327 A1    Dec. 29, 2011

(51) Int. Cl.  
*G06F 35/00* (2006.01)

(52) U.S. Cl. ........................................ 705/35; 705/36 R (58) Field of Classification Search ............... 705/35–45  
See application file for complete search history.

(56) References Cited

U.S. PATENT DOCUMENTS

| | | | | |
|---|---|---|---|---|
| 7,509,261 B1 * | 3/2009 | McManus et al. | ............ | 705/313 |
| 2004/0220868 A1 | 11/2004 | Dainoff et al. | | |
| 2005/0216384 A1 | 9/2005 | Partlow et al. | | |
| 2006/0184438 A1 | 8/2006 | Mcdow | | |
| 2006/0294000 A1 | 12/2006 | Bassett et al. | | |
| 2008/0010108 A1 | 1/2008 | Roberts et al. | | |
| 2008/0027847 A1 * | 1/2008 | Masucci | ...................... | 705/36 R |
| 2008/0288416 A1 * | 11/2008 | Arnott et al. | ................ | 705/36 R |

OTHER PUBLICATIONS

Brad Delong, "What Will the Stock Market Do?", Oct. 17, 1995, pp. 1-4.*  
International Preliminary Report on Patentability for PCT/US2009/069660, mailed Jul. 7, 2010 (6 pages).  
International Search Report and Written Opinion for PCT/US2009/069660, mailed Mar. 2, 2010 (7 pages).  
International Search Report and Written Opinion for PCT/US2011/042200, mailed Sep. 29, 2011 (9 pages).  
Case, Bradford, et al. "Backward / Forward: A New Way to Synthesize and Trade Private Real Estate Market Returns". Proposed paper for presentation at the AREUEA Midyear Meeting, Washington, DC, published Jun. 2010 (12 pages).  
Horrigan, Holly, et al. "REIT-Based Commercial Property Return Indices: A Model to Support and Improve Segment-Specific Investment in the Real Estate Markets". Prepared for the Jan. 2009 AREUEA Annual Meetings, San Francisco, Dec. 24, 2008 (54 pages).  
Geltner, David, et al. "A Regression-Based Approach to Developing Historical Indices of Commercial Property Returns by Type of Property Based on REIT Share Returns". Prepared for Presentation at the AREUEA Annual Meeting, Jan. 5-7, 1996, San Francisco, Dec. 28, 1995 (41 pages).

(Continued)

*Primary Examiner* — Charles Kyle  
*Assistant Examiner* — Jennifer Liu  
(74) *Attorney, Agent, or Firm* — Choate Hall & Stewart, LLP (57) ABSTRACT

The present disclosure is directed to a method of approximating prices in a private property market. First, REIT return data is compiled from each REIT of a plurality of REITs at a predetermined frequency. Then, the REIT return data is processed according to exposures to each of a plurality of target characteristics to obtain coefficients reflecting each REIT's weight in an index. Then, an index is generated according to the REITs, the obtained coefficients, and the weights. Finally, a second index is derived from the generated index that approximates prices in the private property market.

15 Claims, 9 Drawing Sheets

OTHER PUBLICATIONS

Kim, Eui-Hoe. "REIT-Based Pure-Play Portfolios: The Case of Property Types and Geographic Locations". Submitted to the Department of Architecture in Partial Fulfillment of the Requirements for the Degree of Master of Science in Real-Estate Development, Sep. 2004 (60 pages).

Grinold, Richard C., et al. "Active Portfolio Management—A Quantitative Approach for Providing Superior Returns and Controlling Risk". McGraw Hill: New York, 2000 (16 pages).

Liang, Youguo, et al. "Apartment REITs and Apartment Real Estate". The Journal of Real Estate Research, Jan. 1995 (13 pages).

Pagliari, Joseph L., et al. "Public v. Private Real Estate Equities: A More-Refined Long-Term Comparison". 2005 (77 pages).

Horrigan, Holly, et al. "REIT-Based Property Return Indices: A New Way to Track and Trade Commercial Real Estate". Special Real Estate Issue, Sep. 2009 (12 pages).

Greene, William H. "Econometric Analysis: Fifth Edition". Prentice Hall: New Jersey, pp. 56-59. 2003 (6 pages).

Giliberto, S. Michael. "Measuring Real Estate Returns: The Hedged REIT Index". The Journal of Portfolio Management, 1993 (7 pages).

* cited by examiner

| 20-Segment Model | | | 16-Segment Model | | |
|---|---|---|---|---|---|
| Variable | VIF | Factor | Variable | VIF | Factor |
| Apartment East | 1.31 | 1.15 | Apartment East | 1.31 | 1.15 |
| Apartment Midwest | 1.22 | 1.11 | Apartment Midwest | 1.22 | 1.11 |
| Apartment South | 1.32 | 1.15 | Apartment South | 1.31 | 1.15 |
| Apartment West | 1.14 | 1.07 | Apartment West | 1.14 | 1.07 |
| Hotel East | 3.95 | 1.99 | Hotel Combined | 1.00 | 1.00 |
| Hotel Midwest | 10.58 | 3.25 | | | |
| Hotel South | 10.73 | 3.28 | | | |
| Hotel West | 2.70 | 1.64 | | | |
| Industrial East | 1.68 | 1.30 | Industrial East | 1.62 | 1.27 |
| Industrial Midwest | 2.36 | 1.54 | Industrial Midwest | 2.27 | 1.51 |
| Industrial South | 4.26 | 2.06 | Industrial South+West | 1.67 | 1.29 |
| Industrial West | 4.16 | 2.04 | | | |
| Office East | 1.25 | 1.12 | Office East | 1.23 | 1.11 |
| Office Midwest | 1.69 | 1.30 | Office Midwest | 1.58 | 1.26 |
| Office South | 1.63 | 1.28 | Office South | 1.63 | 1.28 |
| Office West | 1.22 | 1.11 | Office West | 1.11 | 1.05 |
| Retail East | 1.22 | 1.10 | Retail East | 1.22 | 1.10 |
| Retail Midwest | 1.34 | 1.16 | Retail Midwest | 1.34 | 1.16 |
| Retail South | 1.27 | 1.13 | Retail South | 1.25 | 1.12 |
| Retail West | 1.42 | 1.19 | Retail West | 1.42 | 1.19 |

FIG. 5 ed as BACKWARD/FORWARD TRADING CONTRACTS BASED ON REIT-BASED PURE PROPERTY RETURN INDEXES

BACKGROUND

1. Technical Field

The present application is directed generally to REIT-based property return indexes and in particular, creating indexes of property market returns according to target characteristics of properties held by the REITS. The present application is also directed generally to creating vehicles, based from such indexes, that approximate prices in the private property market.

2. Description of Related Art

Growing quantities of commercial property equity assets are being held by publicly traded securitized real estate companies, known as Real Estate Investment Trusts (REITS). Public stock exchanges are generally regarded to be more efficient and liquid than traditional private property markets, in which real estate assets trade directly in privately negotiated transactions. However, REITs' diversification across geographic regions and types of property usage, as well as REITs' leverage, inhibits analysts' abilities to use REITs' liquidity for making targeted investments according to desired characteristics of property holdings. Further, REIT-based indexes that track property market segments reflect stock market valuations of the segments and exhibit transient movements inherent in REITs.

SUMMARY

In one aspect, the present disclosure is directed to a method of generating a REIT-based property return index. The method includes compiling REIT return data from each REIT of a plurality of REITs at a predetermined frequency. The method also includes de-levering the generated REIT return data. The method also includes processing the de-levered REIT return data according to exposures to each of a plurality of target characteristics to obtain coefficients reflecting each REIT's weight in an index. The method also includes generating the index according to the REITs, the obtained coefficients, and the weights.

The target characteristics can be property market segments. The compiled REIT return data can reflect total returns or capital returns. In the latter embodiment, the generated index is a price index. The processing can be regression, direct calculation, and/or mathematical constrained optimization. The predetermined frequency can be one of monthly, daily, and real-time. Property holdings lacking the target characteristics for each REIT used to compile REIT return data can comprise less than a predetermined percentage of the REIT's total property holdings. The predetermined percentage can be one of 30%, 40%, and 50%. The Weighted Average Cost of Capital (WACC) accounting identity can be used to de-lever the generated REIT return data. The processing can account for multicollinearity among the target characteristics.

In another aspect, the present disclosure is directed to a method of approximating prices in a private property market. The method includes compiling REIT return data from each REIT of a plurality of REITs at a predetermined frequency. The method also includes processing the REIT return data according to exposures to each of a plurality of target characteristics to obtain coefficients reflecting each REIT's weight in an index. The method also includes generating the index according to the REITs, the obtained coefficients, and the weights. The method also includes deriving a second index from the generated index that approximates prices in the private property market.

Deriving the second index can include averaging the generated index over a window, generating a lagged moving average of the generated index over a window, generating a lagged moving average of the generated index over a window of 250 to 125 weekdays prior to a current day, averaging the daily-updated generated index, and/or equally weighting values of the generated index over a window.

BRIEF DESCRIPTION OF THE DRAWINGS

The foregoing and other objects, aspects, features, and advantages of the present disclosure will become more apparent by referring to the following description taken in conjunction with the accompanying drawings, in which.

DETAILED DESCRIPTION

For purposes of reading the description of the various embodiments below, the following descriptions of the sections of the specification and their respective contents may be helpful:

- Section A presents an overview of the REIT-Based pure property return indexes and index-based investment vehicles generated according to the present disclosure;
- Section B describes exemplary methods for generating REIT-Based pure property return indexes and index-based investment vehicles;
- Section C describes a computing system for generating the REIT-Based pure property return indexes and index-based investment vehicles described herein;
- Section D describes exemplary demonstrations of generating REIT-Based pure property price return indexes and index-based investment vehicles for approximating prices in the private property market.

A. Overview of the REIT-Based Pure Property Return Indexes and Index-Based Investment Vehicles In general overview, the present disclosure relates to systems and methods for generating REIT-based property return indexes, such as total return indexes and price indexes, and investment vehicles based on such indexes. Although REITs own diverse real estate assets across geographical regions and types of property, their holdings of properties nevertheless permit careful manipulation to yield information about underlying property valuations. In particular, REITs may be manipulated to generate de-levered indexes that reflect property returns for groupings of properties according to target characteristics. For example, properties may be grouped according to their segments of the property market. A segment may refer to a combination of property usage type sector(s) (e.g., apartment, industrial, office, retail, hotel), geographical region(s), economic region(s), and/or metropolitan region(s) that defines a segment of the overall aggregate commercial property market. In another example, properties may be grouped according to characteristics such as size, gradation of urbanity (e.g., urban, suburban, or rural), extent of subjection to supply constraints, or any other similar characteristic. As a result, the present disclosure may generate indexes that reflect property returns for the Northeastern hotel property market, the West Coast retail property market, the Midwestern industrial property market, small properties, large properties, suburban properties, urban properties, or any other such category as would be appreciated by one of ordinary skill in the art. For the purposes of this disclosure, such indexes may also be referred to herein as "targeted portfolios."

The indexes generated according to the present disclosure exhibit a number of unique and noteworthy characteristics. First, such indexes appear to lead transactions-based direct property market indexes during market turns. Such information can provide investors with opportunities to make pure, targeted investments in the commercial real estate market while retaining the liquidity benefits of the public market via REITs. Additionally, this information may open opportunities to construct hedges in the real estate market and support derivatives trading.

Second, the indexes exhibit volatilities comparable or less than existing private market transaction-based indices, such as the Moody's/REAL CPPI, reflecting their accuracy as models. Third, the indexes can be generated at the high frequencies (e.g., daily or real-time, the latter referring to data as it becomes available via ticker tape or the like) without significant increases in noise and at various levels of granularity for the target characteristics, thereby providing more detailed information about property prices. Lastly, such indexes can be directly constructed and traded via long and short positions taken in the publicly-traded REITs that compose the indexes. This facilitates pricing of derivatives and also enables construction of exchange-traded funds (ETFs) that track or implement the indexes. Overall, the indexes of the present disclosure can provide accurate high-frequency information about property market prices and/or total returns that can be leveraged for a wide variety of financial initiatives.

Additionally, the indexes can be manipulated to generate vehicles that more closely follow prices in the private property market. As the indexes appear to lead transactions-based direct property market indexes, computing a lagged moving average from one of the indexes can create a vehicle more closely coupled to the private property market, with reduced transient effects inherent in REITs. In this manner, the REIT-based indexes can provide additional information about property markets that investors can leverage financially.

B. Methods of Generating the REIT-Based Pure Property Return Indexes and Index-Based Investment Vehicles To determine the returns for grouping of properties by target characteristics based on REITs, the return for each REIT at a predetermined interval of time may be modeled to account for each target characteristic. Although the models described in the present disclosure are directed to property market segments, the structure and application of the model may be reformulated according to any desired characteristics of the property holdings, as would be appreciated by one of ordinary skill in the art.

Further, the models may be adjusted to produce indexes reflecting price returns or total returns to the groupings of properties by targeted characteristics. When the compiled REIT return data reflects capital returns, the created index tracks price returns. When the compiled REIT return data reflects total returns, including income, the created index tracks total returns.

The particular model for the return for each REIT when modeling according to five usage-type property market segments may follow the formula:

$$r_{i,t} = b_A x_{A,i,t} + b_O x_{O,i,t} + b_I x_{I,i,t} + b_R x_{R,i,t} + b_H x_{H,i,t} + e_{i,t}$$

where:
$b_{S,t}$ is the return to property market segment S at time t,
where:
$x_{A,i,t}$=dollar percentage of assets held by REIT i in apartment segment at time t
$x_{O,i,t}$=dollar percentage of assets held by REIT i in office segment at time t
$x_{I,i,t}$=dollar percentage of assets held by REIT i in industrial segment at time t
$x_{R,i,t}$=dollar percentage of assets held by REIT i in retail segment at time t
$x_{H,i,t}$=dollar percentage of assets held by REIT i in hotel segment at time t
where:

$$x_{A,i,t} + x_{O,i,t} + x_{I,i,t} x_{R,i,t} + X_{H,i,t} = 1$$

and where:
$e_{i,t}$ is an error term reflecting the idiosyncratic return of REIT i at time t Although the model accounts for five property market segments, other embodiments of the model may use any number of segments or any number of groupings of properties by target characteristics.

When the dollar value of assets in a REIT's portfolio cannot be obtained, proxies such as rental income, total square footage, or any comparable metric may be used instead. Further, when REITs include miscellaneous property exposures to non-targeted segments (e.g., land, garages, international assets), such exposures can be aggregated into a single "other" segment and the dollar percentages held by targeted property market segments can be adjusted to sum to one (1). In this manner, the "other" segment can be ignored and the remaining exposures can be rescaled to sum to one (1). For example, if a REIT holds 25% of its holdings in office properties, 60% in industrial properties, and 15% in parking facilities, the office exposure can be converted to 25/85% office, the industrial exposure can be converted to 60/85% industrial, and the parking exposure can be ignored. Using this model, the returns to real estate assets in the "other" segment can be transferred to the idiosyncratic return term, i.e. the error term. In some embodiments, a REIT is included in the index if the "other" segment does not exceed a predetermined percentage of the REIT's total holdings (e.g., 25%, 30%, 40%). Otherwise, the REIT may be filtered out. As a result, the present disclosure can leverage information about property market segments incorporated into an REIT, even if the REIT contains significant holdings outside the targeted segments.

To continue development of the model, the model can be expressed in matrix form as:

$$r_{levered} = X b_{levered} + u$$

where $r_{levered}$ is a vector of length N, with each element representing the monthly return to each of the i=1 ... N REITs. X is an N×K matrix containing the dollar percentages of assets held by each REIT in each of the k=1 ... K segments. u is the idiosyncratic returns of the REITs.

As previously described, REITs exhibit idiosyncratic returns attributed to assets in non-targeted property market segments, REIT-level management, and/or idiosyncratic returns within each REIT's individual property holdings. To obtain the most accurate pure property return index, any approach to generating such indexes would seek to minimize idiosyncratic REIT return variance.

The variance of the idiosyncratic return of a REIT can be modeled as being inversely proportional to the total dollar value of its property holdings. Further, the idiosyncratic returns may be assumed to be uncorrelated, normally distributed, and have mean zero. The idiosyncratic variance $\Omega$ of returns may be constructed according to any method of estimation. For example, $\Omega$ can be defined as an N×N diagonal matrix containing the idiosyncratic REIT return variances, with each diagonal element defined as:

$$u_{i,i}^2 = \frac{1}{total_i}$$

where $total_i$ is the total dollar value of properties held by REIT i. In some embodiments, each diagonal element can be defined as:

$$u_{i,i}^2 = \frac{1}{\sqrt{total_i}}$$

In this manner, property market segment returns can be estimated via generalized least squares according to the following equation:

$$b_{levered} = (X^T \Omega^{-1} X)^{-1} X^T \Omega^{-1} r$$

An intermediate step in the above process includes the determination of the weights for REITs in a targeted portfolio, as the following matrix labeled H:

$$H_{levered} = (X^T \Omega^{-1} X)^{-1} X^T \Omega^{-1}$$

in which $H_{levered}$ is a K×N matrix where each row k represents a portfolio of weights of REITs which has unit exposure, i.e. 100% exposure, to segment k and zero exposure to every segment other than segment k. The property market segment weights sum to one (1) for the target segment and to zero (0) for the non-target segments, and may represent long and short positions for the REITs. If such a portfolio were invested, the portfolio would yield a pure return to the targeted property market segment while minimizing idiosyncratic REIT return variance.

Further, instead of regression via generalized least squares (GLS), the H matrix can be determined via direct mathematical calculation and/or mathematical constraint optimization. The weights can be determined using, for example, the "Solver"® feature of Microsoft Excel, manufactured by Microsoft Corporation of Redmond, Wash. One of ordinary skill can enter the formula for the variance of the targeted portfolio in an Excel cell and instruct the "Solver"® to minimize the value in the cell subject to the following requirements: i) the weights on the targeted segment must sum to one (1), and ii) the weights on all the other segments must sum to zero (0).

This presented method can be further refined to reduce the volatility of the generated index and produce more accurate data regarding property returns. In particular, REITs are typically levered, holding anywhere from 0% debt to over 50% debt. Although the estimated levered property market segment returns incorporate information about underlying property price movements, the leverage increases the volatility of the returns. De-levering the returns decreases the volatility of the index and produces return data about underlying held properties.

One of the ways to de-lever the returns is to use the Weighted Average Cost of Capital (WACC) accounting identity to obtain returns on the underlying assets (roa):

$$roa_{i,t} = (\% \ equity_{i,t}) \cdot r_{i,t} + (\% \ debt_{i,t}) \cdot debtrate_t$$

The equity percentage, also known as the equity ratio, is the total stockholder equity divided by the sum of total stockholder equity and total liability as of the year-end date on 10-K forms. Such ratio data can be updated at any desired frequency (e.g., annually or quarterly) for each year in the study. Further, the equity and debt percentages for each REIT can be generated using financial information about the REITs from NAREIT and annual 10-K forms, by way of example. In some embodiments, when minority interests represent significant portions of REIT balance sheets, the equity and debt percentages can be adjusted to account for such holdings. However, when these holdings are insignificant, adjustments need not be made. The returns in the above formula can refer to capital returns (reflecting price changes) or total returns (including income).

The same debt rate may be used for all REITs. Further, the debt rate may be calculated according to any number of methods. For example, market-wide average yields on unsecured REIT debt may be used as a proxy for the cost of debt, and the same rate may be applied to every REIT for the year. In some embodiments, the weighted average cost of debt reported in some REITs' annual 10-K filings may be used as the debt rate, instead. Another method of calculating the debt rate may follow the formula:

$$debtrate_{i,t} = (IE_{i,t} + PD_{i,t})/(0.5(TD_{i,t} + TD_{i,t-1}) + 0.5(PS_{i,t} + PS_{i,t-1}))$$

where:
$IE_{i,t}$=the interest expense for firm i in period t
$PD_{i,t}$=the preferred dividends paid by firm i in period t
$TD_{i,t}$=firm i's total debt balance (book value) in period t
$PS_{i,t}$=firm i's preferred stock at the end of year t Although these embodiments contemplate using the same debt rate for all REITs, de-leveraging may also be accomplished by using REIT-specific values.

Once the calculated REIT returns are de-levered, the mathematical model for returns on property market segments can be written as:

$$roa = Xb_{delevered} + u$$

and the property market segment returns and weights for REITs in a targeted portfolio can be solved according to revised formulas of:

$$b_{delevered} = (X^T \Omega^{-1} X)^{-1} X^T \Omega^{-1} roa$$

$$H_{delevered} = (X^T \Omega^{-1} X)^{-1} X^T \Omega^{-1}$$

Under these revised formulas, the estimated coefficients of b directly reflect the returns to the underlying property segments. Thus, regression of the REIT returns against the REIT's proportional exposures to each of the property segments produces the estimated coefficients and may be performed, for example, via a GLS approach, which minimizes the sum of the squared errors of the regression. These regressions can be calculated for intervals of varying and/or predetermined length over any period of time, thereby generating coefficients according to such intervals. For example, REIT returns can be regressed against segment exposures on a monthly basis to generate coefficients for each month. Likewise, the returns can be regressed on a daily basis to generate daily coefficients. In other examples, the returns can be regressed on a pooled basis. In further examples, the desired solution can be obtained by direct mathematical calculation and/or mathematically constrained optimization as described in more detail, above.

The targeted portfolios contained in $H_{de-levered}$ do not include the debt positions needed to offset the leverage held by the REITs, because that leverage has already been removed. Further, the optimal relative weights of the REITs in the targeted portfolio may be independent of leverage and the techniques used to de-leverage the REIT returns. As a result, scaling the coefficients calculated via regression would produce the same portfolio with varying amounts of leverage. Further, to generate the portfolio of assets that would theoretically need to be purchased to obtain targeted property segment-specific returns, completely adjusting for leverage, the segment portfolios would need adjustment. These adjustments can be accomplished by returning to the WACC identity for each REIT:

$$h\text{adjusted}_{k,i} = (\% \text{ equity}_i) \cdot h_{k,i}$$

$$\text{debtoffset}_{k,i} = (\% \text{ debt}_i) \cdot h_{k,i}$$

where $h_{k,j}$ is the share (long or short) of the portfolio for target segment k to be invested in REIT j.

Another approach to modeling the returns for property market segments based on REITs is the pureplay approach, as described by:

$$\tilde{r}_i = x_{A,i}(\tilde{r}_A + \tilde{e}_{A,i}) + x_{O,i}(\tilde{r}_O + \tilde{e}_{O,i}) + x_{I,i}(\tilde{r}_I + \tilde{e}_{I,i}) + \ldots + x_{K,i}(\tilde{r}_K + \tilde{e}_{K,i})$$

where:
$r_i$=observed return to REIT i
$\tilde{r}_k$=pureplay return to segment k
$x_{k,i}$=fraction of REIT i invested in segment k
$\tilde{e}_{k,i}$=idiosyncratic return to REIT i's property in segment k
and where:

$$\sum_K x_{k,i} = 1$$

where K denotes the last of some number of segments.

The idiosyncratic components in the pureplay model are assumed to be random, uncorrelated with each other, and have mean zero. As a pureplay model is defined as an index with unit exposure to the desired segment and zero exposure to all other segments:

$$\tilde{r}_p = \tilde{r}_A \sum_{i=1}^{N} w_i x_{A,i} + \tilde{r}_O \sum_{i=1}^{N} w_i x_{O,i} + \ldots +$$

$$\tilde{r}_K \sum_{i=1}^{N} w_i x_{K,i} + \sum_{i=1}^{N} (w_i x_{A,i} e_{A,i} + \ldots + w_i x_{K,i} e_{K,i})$$

where each $w_i$ equals the percentage of the index's holdings in REIT i and where the constraints for a pureplay index for a single segment k can be written mathematically as:

$$\sum_{i=1}^{N} \sum_{j \neq k} w_i x_{i,j} = 0$$

$$\sum_{i=1}^{N} w_i x_{i,k} = 1$$

Substituting the above constraints into the formula for the pureplay index results in a simplified equation for the return to the pureplay index for segment k:

$$\tilde{r}_p = \tilde{r}_k + \sum_{i=1}^{N} (w_i x_{A,i} e_{A,i} + \ldots + w_i x_{K,i} e_{K,i})$$

whose variance can be described according to:

$$VAR(\tilde{r}_p) = VAR(\tilde{r}_k) + \sum_{i=1}^{N} (w_i^2 x_{A,i}^2 VAR(e_{A,i}) + \ldots + w_i^2 x_{K,i}^2 VAR(e_{K,i}))$$

The idiosyncratic segment variance is assumed to be inversely proportional to a REIT's dollar holdings in that segment:

$$VAR(e_{k,i}) = \frac{1}{x_{k,i} \cdot total_i}$$

Substituting this expression for segment variance into the formula for index variance results in:

$$VAR(\tilde{r}_p) = VAR(\tilde{r}_k) + \sum_{i=1}^{N} \left( w_i^2 x_{A,i}^2 \frac{1}{x_{A,i} \cdot total_i} + \ldots + w_i^2 x_{K,i}^2 \frac{1}{x_{K,i} \cdot total_i} \right)$$

Which can be simplified to:

$$VAR(\tilde{r}_p) = VAR(\tilde{r}_k) + \sum_{i=1}^{N} \left( w_i^2 \cdot \frac{1}{total_i} \right)$$

Differentiating this equation with respect to $w_i$ for the purposes of minimization reveals that the solution is a function of the second term.

Because of the assumptions regarding idiosyncratic returns, the variance of the idiosyncratic returns in the pureplay model reduces to the same variance assumption used in the previous regression models. As the previous regression models minimized, the sum of the squared errors of the regression, the models minimized the variance of the error terms (i.e., the idiosyncratic returns). These variances are assumed values contained in $\Omega$, as previously defined. Therefore, the regression solution yielding $H_{de-levered}$ is identical to the solution to minimizing the variance of the pureplay model with respect to the $w_i$. For this reason, mathematical constrained optimization yields comparable targeted portfolio weights as regression.

Further, the presently disclosed models can be modified to achieve varying levels of granularity for property market segments. In the regression model thus described, the model targets property market segments such as the apartment segment, the office segment, the industrial segment, the retail segment, and the hotel segment. In some embodiments, the model can target property market segments by geographical region instead (e.g., Northeast, Midwest, West Coast, South), which may be defined according to the National Council of Real Estate Investment Fiduciaries's (NCREIF) convention, by way of example.

Alternatively, the model can target segments according to both usage type of properties and geographical region. In these embodiments, the model can account for apartment segments specific to each region, office segments specific to each region, and so on. In further embodiments, the model can account for any grouping of properties by target characteristics, such as small properties or large properties, granularity of urbanity (urban, suburban, rural), environmental ratings (e.g., "green properties"), or the like. The model can account for any usage type, geographical region, target characteristic, or combination thereof as would be appreciated by one of ordinary skill in the art. In any of these embodiments, calculated REIT returns would be regressed against exposures to each target segment or subject to mathematical constrained optimization to obtain the corresponding coefficients.

For example, to begin constructing a model that targeted geographical and usage type segments of the property market, the following variables could be defined:

$x_{W,i,t}$=dollar percentage of assets held by REIT i in the West region at time t $x_{MW,i,t}$=dollar percentage of assets held by REIT i in the Midwest region at time t $x_{E,i,t}$=dollar percentage of assets held by REIT i in the East region at time t $x_{S,i,t}$=dollar percentage of assets held by REIT i in the South region at time t where:

$$x_{W,i,t}+x_{MW,i,t}+x_{E,i,t}+x_{S,i,t}=1$$

To achieve finer granularity on the basis of usage type, each variable in the above preliminary model can be expanded to multiple variables covering each usage type. For example, the variable for the apartment segment represented by:

$x_{A,i,t}$=dollar percentage of assets held by REIT i in apartment segment at time t can be replaced with:

$x_{W,A,i,t}$=dollar percentage of assets held by REIT i in the west in apartment segment at time t $X_{S,A,i,t}$=dollar percentage of assets held in the south in apartment segment at time t $x_{E,A,i,t}$=dollar percentage of assets held in the east in apartment segment at time t $x_{MW,A,i,t}$=dollar percentage of assets held in the Midwest in apartment segment at time t However, as the number of target property market segments grows, the multicollinearity among at least some of the segments can cause excessive standard errors in the corresponding estimated segment returns. Variance inflation factors (VIFs) can quantify the severity of this multicollinearity and be used to mitigate the severity of the multicollinearity's effects. After property market segments with high VIFs are identified, these segments can be aggregated into less granular segments, thereby reducing the total number of segments against which the REIT returns will be regressed.

The VIF is derived from the equation for the variance of the regression coefficients:

$$VAR(b_k) = \frac{\sigma^2}{(1-R_k^2)\sum_{i=1}^{N}(x_{i,k}-\bar{x}_k)^2}$$

where $R_k^2$ is the R-squared from the regression of explanatory variable k on all explanatory variables excluding variable k. As $R_k^2$ gets larger, the variance of the estimated regression coefficient becomes larger. In the case of perfect collinearity, $R_k^2=1$ and the variance of the estimated regression coefficient is infinite. VIF is defined as:

$$VIF_k = \frac{1}{(1-R_k^2)}$$

In further embodiments, VIF can be determined as described in "Econometric Analysis," $5^{th}$ edition, by Greene.

VIF captures the relationship between the collinearity of a variable and the resulting increase in variance of the estimated coefficient for the variable. The square root of the VIF measures how many times higher the standard error of the regression coefficient is as a result of collinearity. A factor equal to one implies that there is no collinearity for explanatory variable k; the standard errors are not inflated (variable k is orthogonal). A factor equal to two implies that the standard errors for coefficient k are twice as high as they would be if variable k was orthogonal. Thus, variables with high VIFs may be identified and combined. Regressing the REIT returns, performing direct calculation, or mathematical constraint optimization in light of the modified target segments results in more accurate indexes about the property market segments.

After an index for a property market segment is generated, computing a lagged moving average of the index can produce a vehicle that approximates prices in the private property market. The lag can correspond to a window of time of any length. For example, the window can be 7, 14, 30, 45, 60, 90, 120, or 180 days. The lag can correspond to a window of time prior to a current day. For example, the lagged moving average for a day can be the average of index values from thirty (30) to sixty (60) days ago. In some embodiments, the window can run from 250 to 125 weekdays prior to the current day, and in other embodiments, the window can run from six (6) to twelve (12) months prior to the current day. In additional embodiments, the window can run from 45 to 90 days, 120 to 180 days, 60 to 120 days, or any other length of days prior to the current day. The window can define the lagged moving average. For example, a lagged moving average with a window of 250 to 125 weekdays prior to the current day can be referred to as a "Backward/Forward 125-250" contract.

Additionally, the moving average can be updated on any basis. For example, the average can be daily-updated, weekly-updated, biweekly-updated, or monthly-updated. Further, the moving average can exhibit any type of weighting. In some embodiments, each value of the index in the window can be equally weighted. In other embodiments, values on one end of the window can be weighted heavier. In this manner, the lagged moving average can exhibit any window for lag, frequency for updating, or weighting as would be appreciated by one of ordinary skill in the art.

C. Computing System

Figure 1A:
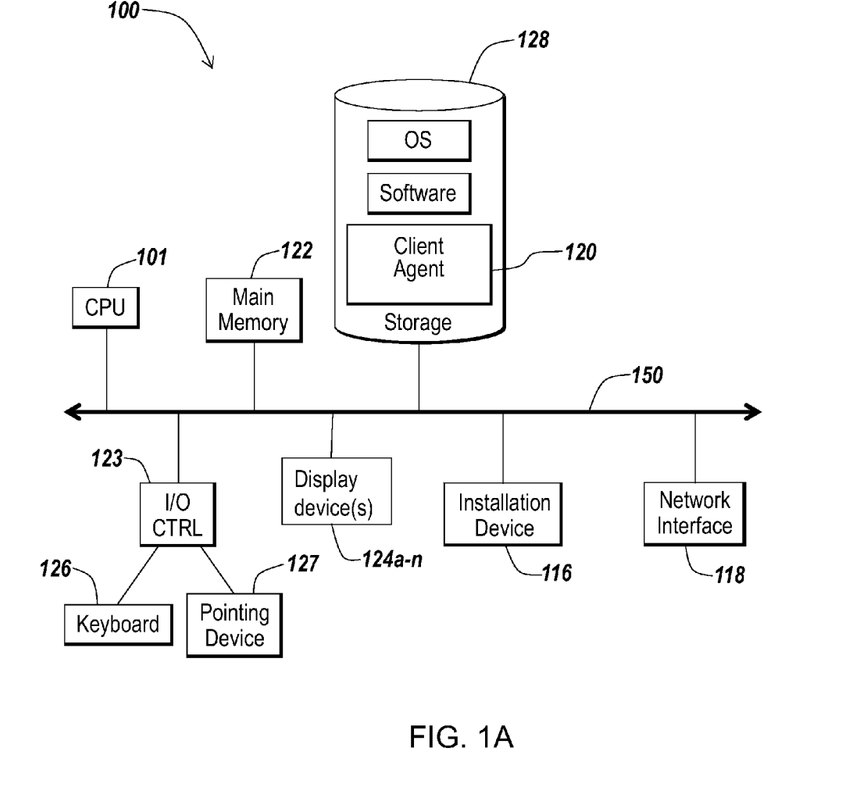
FIGS. 1A and 1B are exemplary block diagrams of a computing system for generating the REIT-based pure property return indexes and index-based investment vehicles for approximating prices in the private property market.
Figure 1B:
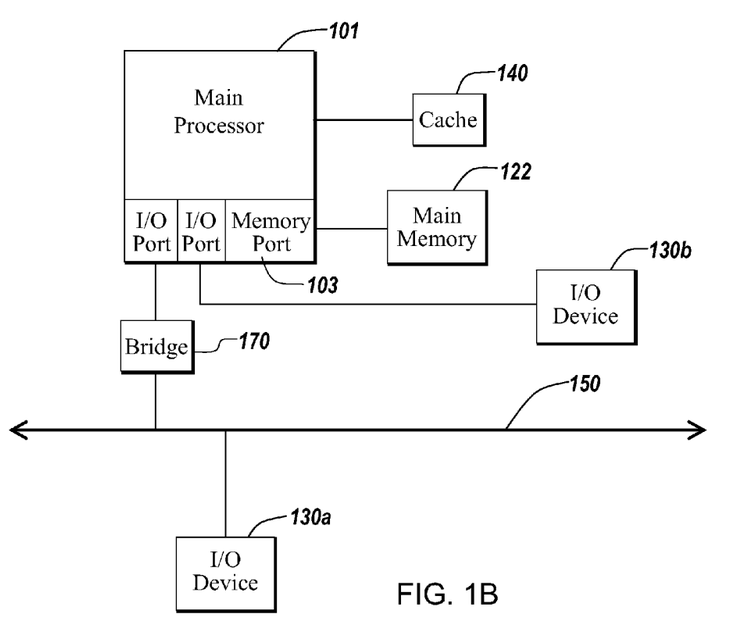
Figure 2A:
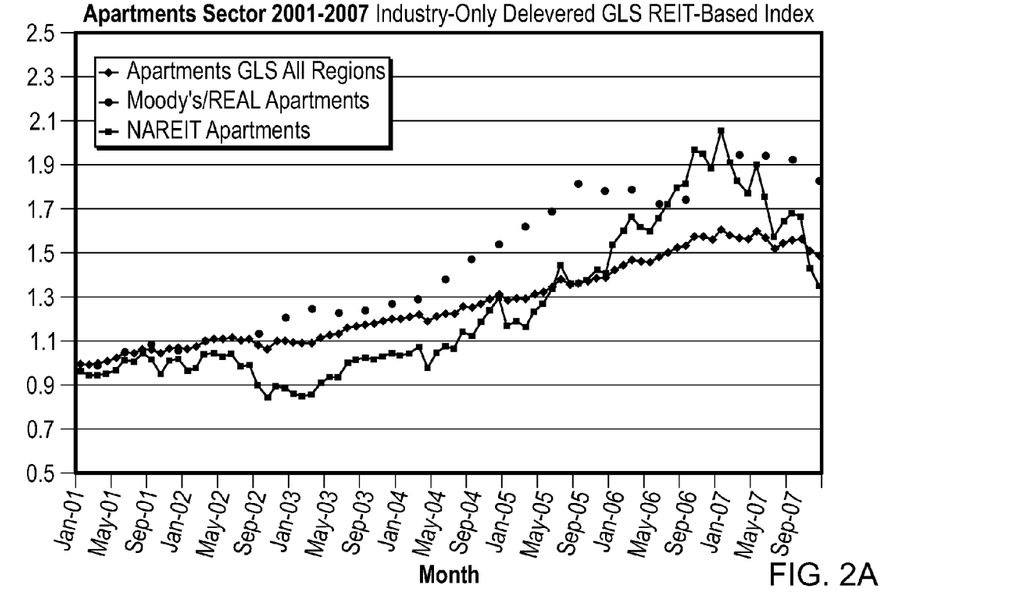
FIG. 2A-2E are exemplary graphical depictions of REIT-based pure property price return indexes according to usage type sectors.
Figure 2B:
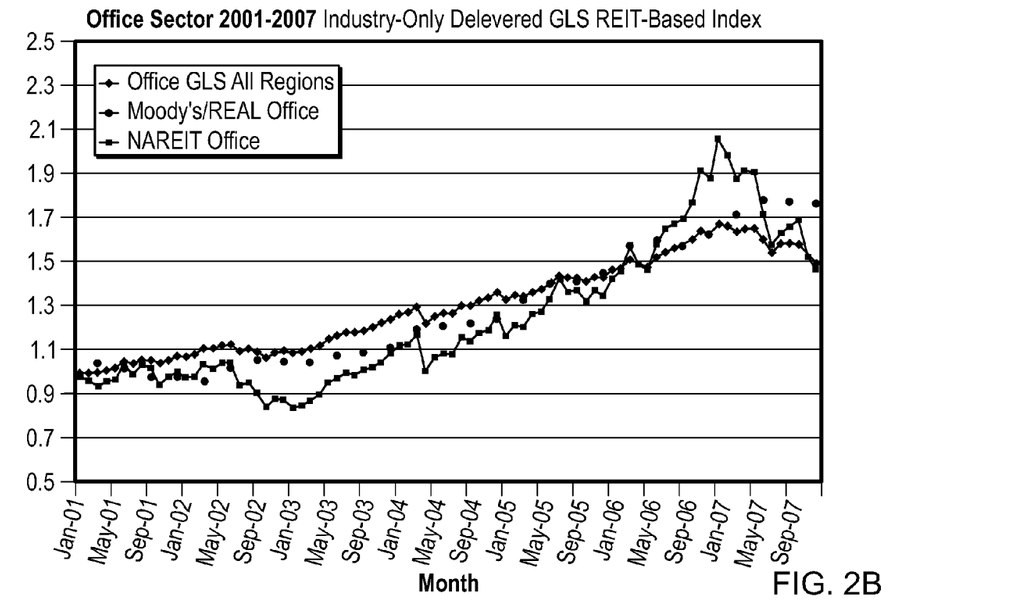
Figure 2C:
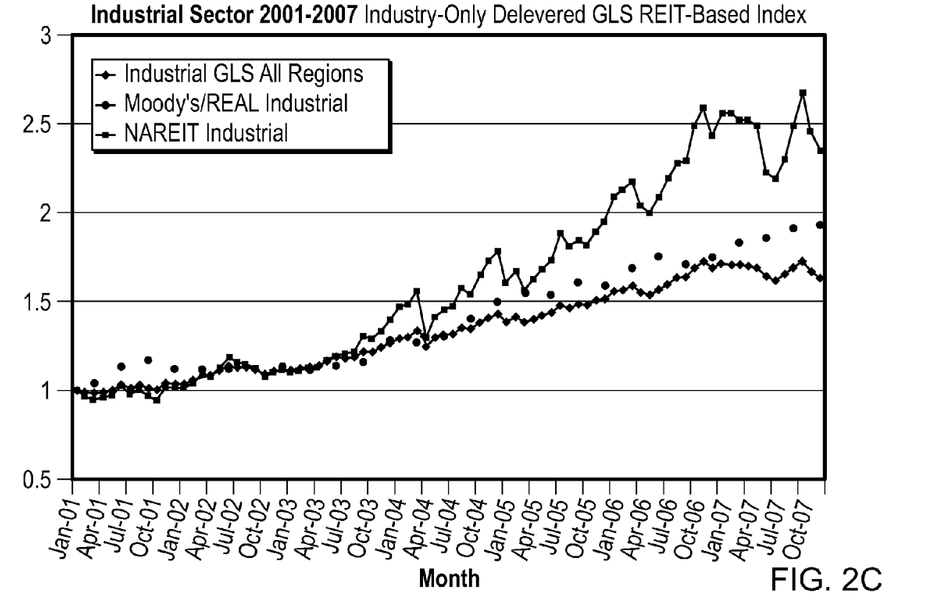
Figure 2D:
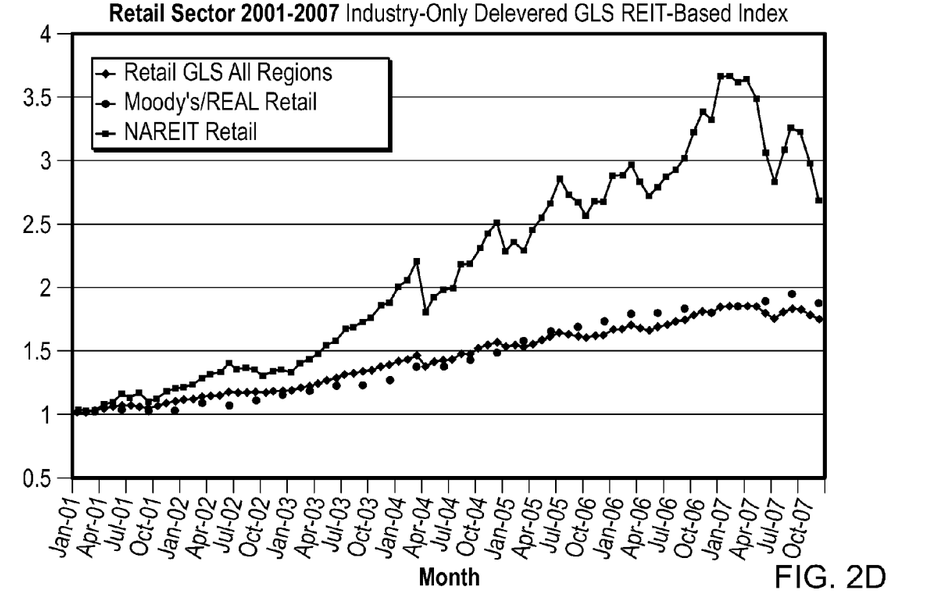
Figure 2E:
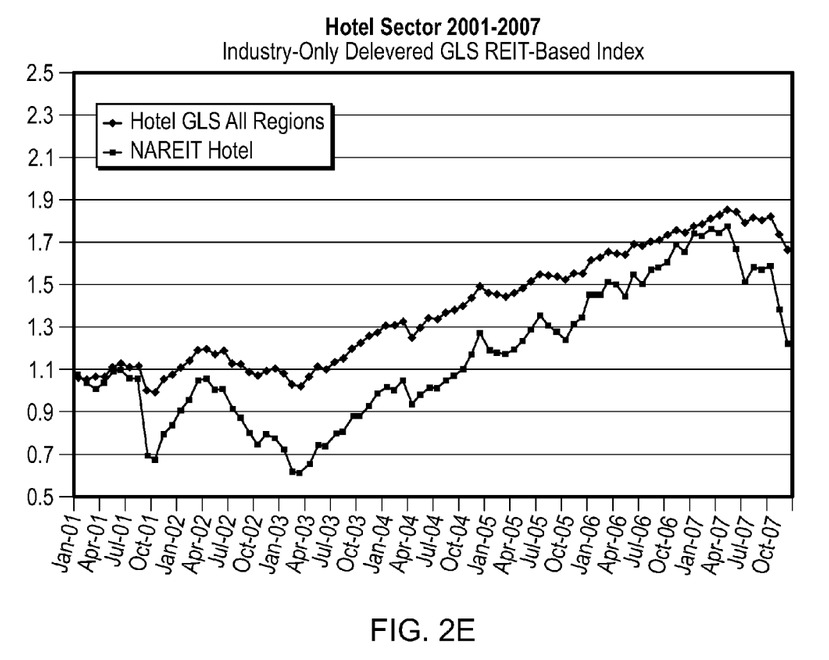

Referring now to FIGS. 1A and 1B, exemplary block diagrams of a computing system 100 for generating characteristic-specific, de-levered indexes of property market returns is shown and described. The computing system 100 can be any type and form of computing device, such as a computer, server, or network device capable of communicating on any type and form of network and performing the operations described herein.

FIGS. 1A and 1B depict block diagrams of a computing device 100 useful for practicing the steps of the present disclosure. As shown in FIGS. 1A and 1B, each computing device 100 includes a central processing unit 101, and a main memory unit 122. As shown in FIG. 1A, a computing device 100 may include a visual display device 124, a keyboard 126 and/or a pointing device 127, such as a mouse. Each computing device 100 may also include additional optional elements, such as one or more input/output devices 130a-130b (generally referred to using reference numeral 130), and a cache memory 140 in communication with the central processing unit 101.

The central processing unit 101 is any logic circuitry that responds to and processes instructions fetched from the main memory unit 122. In many embodiments, the central processing unit is provided by a microprocessor unit, such as: those manufactured by Intel Corporation of Mountain View, Calif.; those manufactured by Motorola Corporation of Schaumburg, Ill.; those manufactured by Transmeta Corporation of Santa Clara, Calif.; the RS/6000 processor, those manufactured by International Business Machines of White Plains, N.Y.; or those manufactured by Advanced Micro Devices of Sunnyvale, Calif. The computing device 100 may be based on any of these processors, or any other processor capable of operating as described herein.

Main memory unit 122 may be one or more memory chips capable of storing data and allowing any storage location to be directly accessed by the microprocessor 101, such as Static random access memory (SRAM), Burst SRAM or Synch-Burst SRAM (BSRAM), Dynamic random access memory (DRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Enhanced DRAM (EDRAM), synchronous DRAM (SDRAM), JEDEC SRAM, PC100 SDRAM, Double Data Rate SDRAM (DDR SDRAM), Enhanced SDRAM (ESDRAM), SyncLink DRAM (SLDRAM), Direct Rambus DRAM (DRDRAM), or Ferroelectric RAM (FRAM). The main memory 122 may be based on any of the above described memory chips, or any other available memory chips capable of operating as described herein. In the embodiment shown in FIG. 1A, the processor 101 communicates with main memory 122 via a system bus 150 (described in more detail below). FIG. 1B depicts an embodiment of a computing device 100 in which the processor communicates directly with main memory 122 via a memory port 103. For example, in FIG. 1B the main memory 122 may be DRDRAM.

FIG. 1B depicts an embodiment in which the main processor 101 communicates directly with cache memory 140 via a secondary bus, sometimes referred to as a backside bus. In other embodiments, the main processor 101 communicates with cache memory 140 using the system bus 150. Cache memory 140 typically has a faster response time than main memory 122 and is typically provided by SRAM, BSRAM, or EDRAM. In some embodiments, the cache memory 140 can store any REIT or other real estate-related data pertinent to generating indexes of the present disclosure. Some examples of this data can include REIT return data, bond data, property holding data, or any combination thereof.

In the embodiment shown in FIG. 1B, the processor 101 communicates with various I/O devices 130 via a local system bus 150. Various busses may be used to connect the central processing unit 101 to any of the I/O devices 130, including a VESA VL bus, an ISA bus, an EISA bus, a MicroChannel Architecture (MCA) bus, a PCI bus, a PCI-X bus, a PCI-Express bus, or a NuBus. For embodiments in which the I/O device is a video display 124, the processor 101 may use an Advanced Graphics Port (AGP) to communicate with the display 124. FIG. 1B depicts an embodiment of a computer 100 in which the main processor 101 communicates directly with I/O device 130b via HyperTransport, Rapid I/O, or InfiniBand. FIG. 1B also depicts an embodiment in which local busses and direct communication are mixed: the processor 101 communicates with I/O device 130b using a local interconnect bus while communicating with I/O device 130a directly.

The computing device 100 may support any suitable installation device 116, such as a floppy disk drive for receiving floppy disks such as 3.5-inch, 5.25-inch disks or ZIP disks, a CD-ROM drive, a CD-R/RW drive, a DVD-ROM drive, tape drives of various formats, USB device, hard-drive or any other device suitable for installing software and programs such as any client agent 120, or portion thereof. The computing device 100 may further comprise a storage device 128, such as one or more hard disk drives or redundant arrays of independent disks, for storing an operating system and other related software, and for storing application software programs such as any program related to the client agent 120. Optionally, any of the installation devices 116 could also be used as the storage device 128. Additionally, the operating system and the software can be run from a bootable medium, for example, a bootable CD, such as KNOPPIX®, a bootable CD for GNU/Linux that is available as a GNU/Linux distribution from knoppix.net.

Furthermore, the computing device 100 may include a network interface 118 to interface to a Local Area Network (LAN), Wide Area Network (WAN) or the Internet through a variety of connections including, but not limited to, standard telephone lines, LAN or WAN links (e.g., 802.11, T1, T3, 56 kb, X.25), broadband connections (e.g., ISDN, Frame Relay, ATM), wireless connections, or some combination of any or all of the above. The network interface 118 may comprise a built-in network adapter, network interface card, PCMCIA network card, card bus network adapter, wireless network adapter, USB network adapter, modem or any other device suitable for interfacing the computing device 100 to any type of network capable of communication and performing the operations described herein.

A wide variety of I/O devices 130a-130n may be present in the computing device 100. Input devices include keyboards, mice, trackpads, trackballs, microphones, and drawing tablets. Output devices include video displays, speakers, inkjet printers, laser printers, and dye-sublimation printers. The I/O devices 130 may be controlled by an I/O controller 123 as shown in FIG. 1A. The I/O controller may control one or more I/O devices such as a keyboard 126 and a pointing device 127, e.g., a mouse or optical pen. Furthermore, an I/O device may also provide storage 128 and/or an installation medium 116 for the computing device 100. In still other embodiments, the computing device 100 may provide USB connections to receive handheld USB storage devices such as the USB Flash Drive line of devices manufactured by Twintech Industry, Inc. of Los Alamitos, Calif.

In some embodiments, the computing device 100 may comprise or be connected to multiple display devices 124a-124n, which each may be of the same or different type and/or form. As such, any of the I/O devices 130a-130n and/or the I/O controller 123 may comprise any type and/or form of suitable hardware, software, or combination of hardware and software to support, enable or provide for the connection and use of multiple display devices 124a-124n by the computing device 100. For example, the computing device 100 may include any type and/or form of video adapter, video card, driver, and/or library to interface, communicate, connect or otherwise use the display devices 124a-124n. In one embodiment, a video adapter may comprise multiple connectors to interface to multiple display devices 124a-124n. In other embodiments, the computing device 100 may include multiple video adapters, with each video adapter connected to one or more of the display devices 124a-124n. In some embodiments, any portion of the operating system of the computing device 100 may be configured for using multiple displays 124a-124n. In other embodiments, one or more of the display devices 124a-124n may be provided by one or more other computing devices, such as computing devices 100a and 100b connected to the computing device 100, for example, via a network. These embodiments may include any type of software designed and constructed to use another computer's display device as a second display device 124a for the computing device 100. One ordinarily skilled in the art will recognize and appreciate the various ways and embodiments that a computing device 100 may be configured to have multiple display devices 124a-124n.

In further embodiments, an I/O device 130 may be a bridge 170 between the system bus 150 and an external communication bus, such as a USB bus, an Apple Desktop Bus, an RS-232 serial connection, a SCSI bus, a FireWire bus, a FireWire 800 bus, an Ethernet bus, an AppleTalk bus, a Gigabit Ethernet bus, an Asynchronous Transfer Mode bus, a HIPPI bus, a Super HIPPI bus, a SerialPlus bus, a SCI/LAMP bus, a FibreChannel bus, or a Serial Attached small computer system interface bus.

A computing device 100 of the sort depicted in FIGS. 1A and 1B typically operate under the control of operating systems, which control scheduling of tasks and access to system resources. The computing device 100 can be running any operating system such as any of the versions of the Microsoft® Windows operating systems, the different releases of the Unix and Linux operating systems, any version of the Mac OS® for Macintosh computers, any embedded operating system, any real-time operating system, any open source operating system, any proprietary operating system, any operating systems for mobile computing devices, or any other operating system capable of running on the computing device and performing the operations described herein. Typical operating systems include: WINDOWS 3.x, WINDOWS 95, WINDOWS 98, WINDOWS 2000, WINDOWS NT 3.51, WINDOWS NT 4.0, WINDOWS CE, and WINDOWS XP, all of which are manufactured by Microsoft Corporation of Redmond, Wash.; MacOS, manufactured by Apple Computer of Cupertino, Calif.; OS/2, manufactured by International Business Machines of Armonk, N.Y.; and Linux, a freely-available operating system distributed by Caldera Corp. of Salt Lake City, Utah, or any type and/or form of a Unix operating system, among others.

In other embodiments, the computing device 100 may have different processors, operating systems, and input devices consistent with the device. For example, in one embodiment the computer 100 is a Treo 180, 270, 1060, 600 or 650 smart phone manufactured by Palm, Inc. In this embodiment, the Treo smart phone is operated under the control of the PalmOS operating system and includes a stylus input device as well as a five-way navigator device. Moreover, the computing device 100 can be any workstation, desktop computer, laptop or notebook computer, server, handheld computer, mobile telephone, any other computer, or other form of computing or telecommunications device that is capable of communication and that has sufficient processor power and memory capacity to perform the operations described herein.

D. Exemplary Demonstrations of Generating Reit-Based Pure Property Price Return Indexes Demonstrative examples of generating REIT-based pure property price return indexes are herein described. In the first example, the REITs forming the basis for the index are the publically traded equity REITS listed in the NAREIT/FTSE indices during the period 2001-2007. REIT return data was first computed on a monthly basis for the 84 months from 2001-2007 according to the following formula:

$$r_{i,t} = \frac{REIT\ price_{i,t} - REIT\ price_{i,t-1}}{REIT\ price_{i,t-1}}$$

Such return data may be computed based on property holding information supplied by NAREIT, data from public SEC 10-K filings, and/or any comparable source of information. In this example, the return data is based on price-only returns that exclude dividends, thereby accounting for price movements alone. Further, the REIT prices can be adjusted for splits. Then, the REIT return data was de-levered according to $$roa_{i,t} = (\%\ equity_{i,t}) \cdot r_{i,t} + (\%\ debt_{i,t}) \cdot debtrate_t$$

in which financial information from NAREIT and annual 10-K filings were used to calculate the debt and equity percentages for each REIT. The equity and debt percentages were updated annually for each year analyzed. Further, because minority interests were relatively insignificant on the balance sheets of most REITs, the equity and debt percentages were not adjusted for such interests.

In this example, the market-wide average yields on unsecured REIT debt was used as a proxy for the cost of debt, with the same rate applied to every REIT for the year. As a result, by way of example, a 5.66% debt percentage was used for all REITs in 2007. As Boston Properties reported a weighted average cost of debt of 5.60% and Mack-Cali Realty reported a value of 6.08% in 2007, the estimate was reasonable. In other examples, the weighted average cost of debt reported in REIT annual 10-K filings may have been used instead.

GLS regressions were run for each of the eighty four months spanning 2001-2007 against the apartment, office, industrial, retail, and hotel segments. The resulting segment returns were accumulated to produce the segment-specific indexes, which are plotted against the equivalent Moody's/REAL CPPI indexes (e.g., transactions price based indexes of U.S. commercial property price movements in the direct private property market) in FIGS. 2A-2E. The correspondence between the REIT-based and Moody's/REAL price indexes suggests that the REIT-based indices are indeed accurately reporting segment-specific returns to the underlying property market. Further, the annualized volatilities of REIT-based de-levered indexes are similar or lower than the volatilities of the Moody's/REAL indexes over the same period, as demonstrated by the following table:

|  | Apt | Office | Indust | Retail | Hotel |
|---|---|---|---|---|---|
| REIT-based Monthly Delevered Annualized Volatility | 4.80% | 5.84% | 6.46% | 5.18% | 10.15% |
| Moody's/REAL Quarterly Annualized Volatility | 8.06% | 6.27% | 7.05% | 5.11% | N/A |

As the figures demonstrate, the REIT-based de-levered data often leads the private market price movements. For example, the REIT-based Office index begins to decline in January 2007, whereas the Moody's/REAL suggests that prices in the private market did not begin to decline until after the following June.

Figure 3:
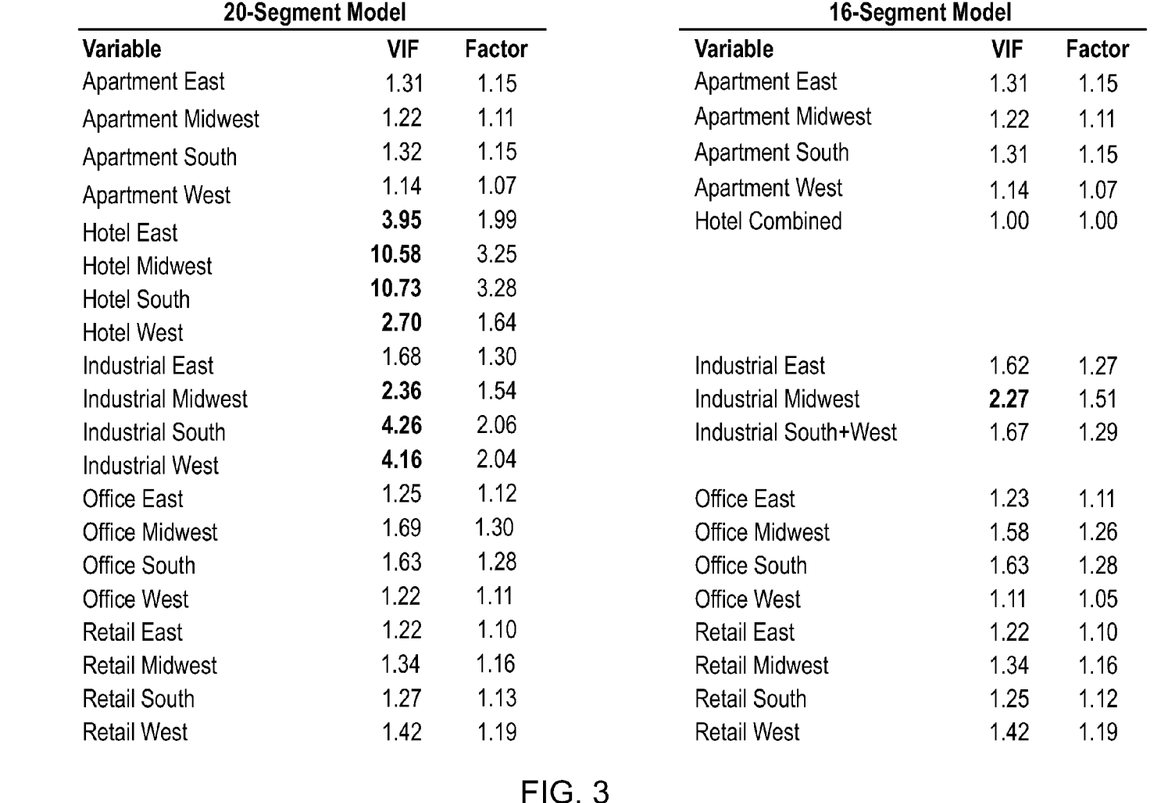
FIG. 3 is a table demonstrating exemplary Variance Inflation Factors (VIFs) across target property segments.
Figure 4A:
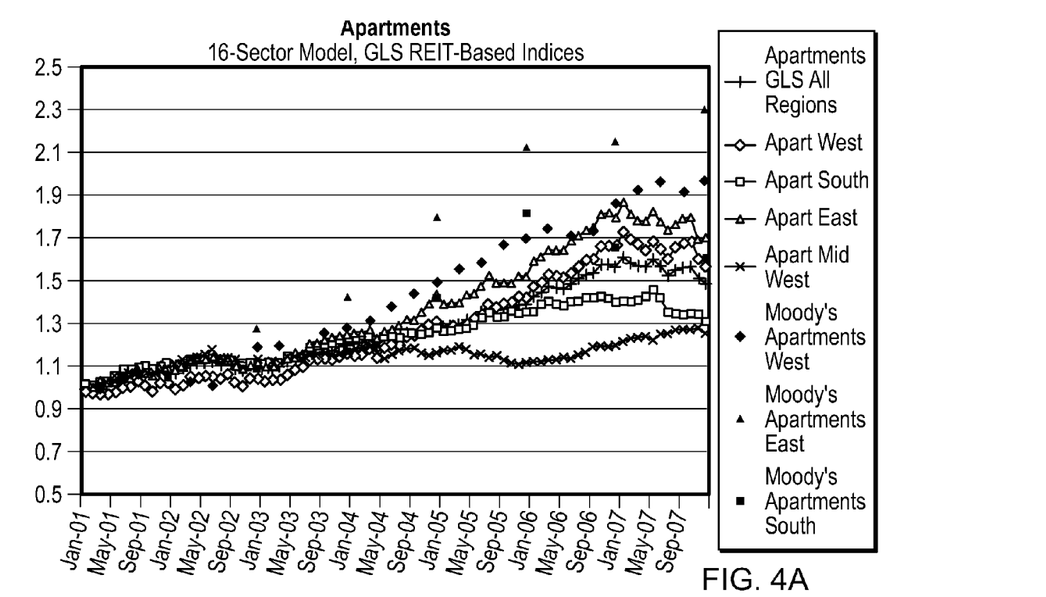
FIG. 4A-4D are exemplary graphical depictions of REIT-based pure property price indexes that account for VIFs.
Figure 4B:
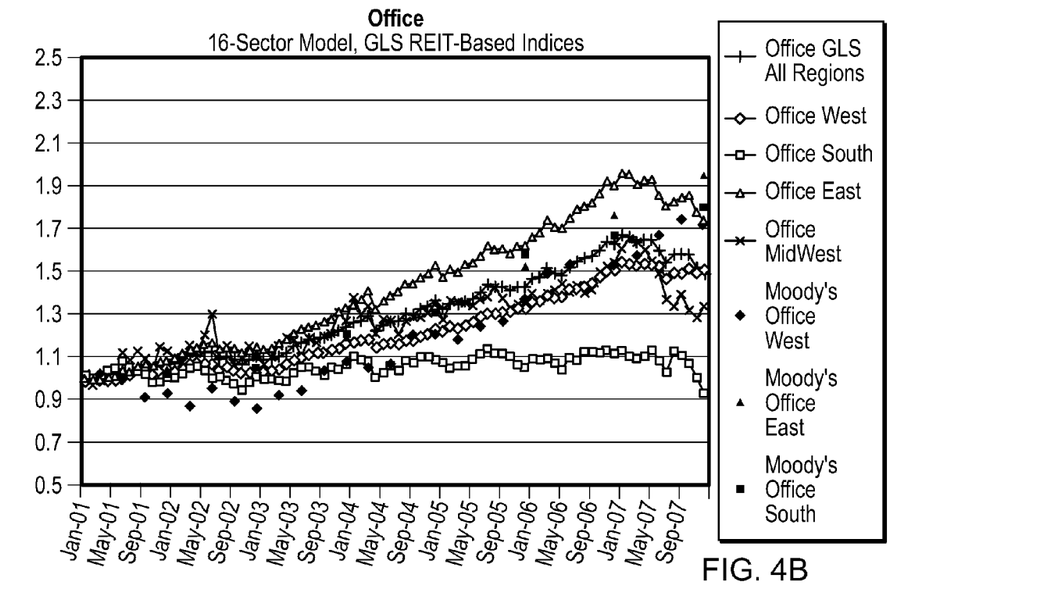
Figure 4C:
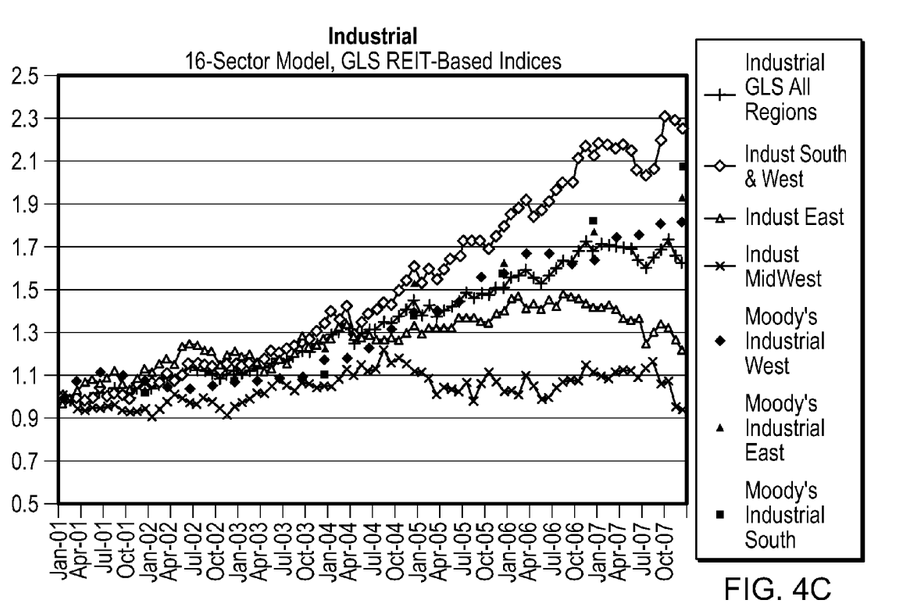
Figure 4D:
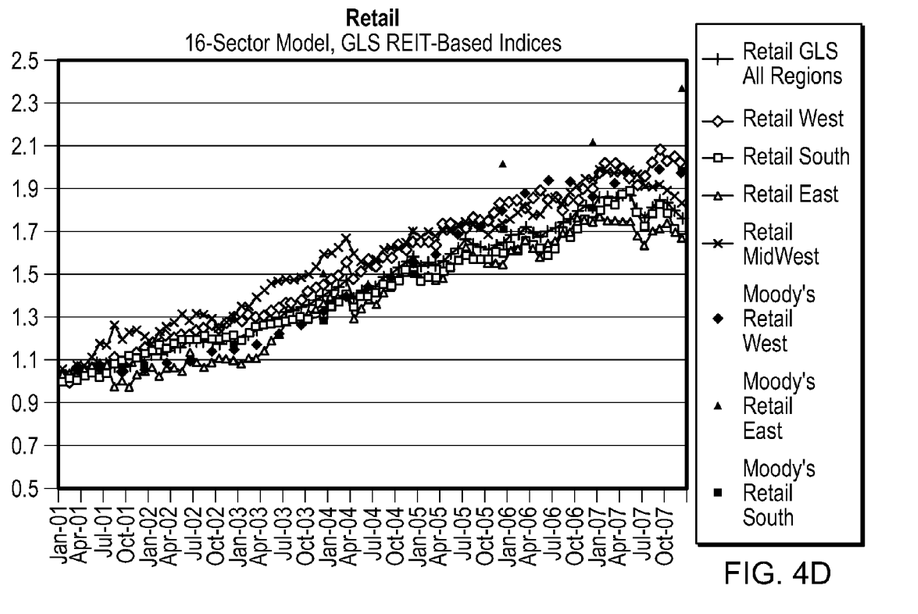

For further refinement, each of the five property type segments was subdivided into four regional market segments, yielding a total of twenty variables. Then, for each month over the period 2001-2007, each of the twenty segments was regressed against all the remaining segments to calculate VIFs. The monthly average VIF for each segment is depicted in FIG. 3, with high VIFs in bold type. Because the hotel market segments across the four geographical regions demonstrate high VIFs, these segments can be combined into a single segment. Further, high VIFs between the Industrial South and Industrial West indicate that these two segments shall be combined, too. As a result, the 20-segment model collapses into a 16-segment model.

Then, the de-levered REIT return data is re-regressed according to the 16-segment model. FIGS. 4A-4D depict the results for the apartment, office, industrial, and retail sectors for each geographical region, again plotted against the corresponding Moody's/REAL CPPI index.

Figure 5:
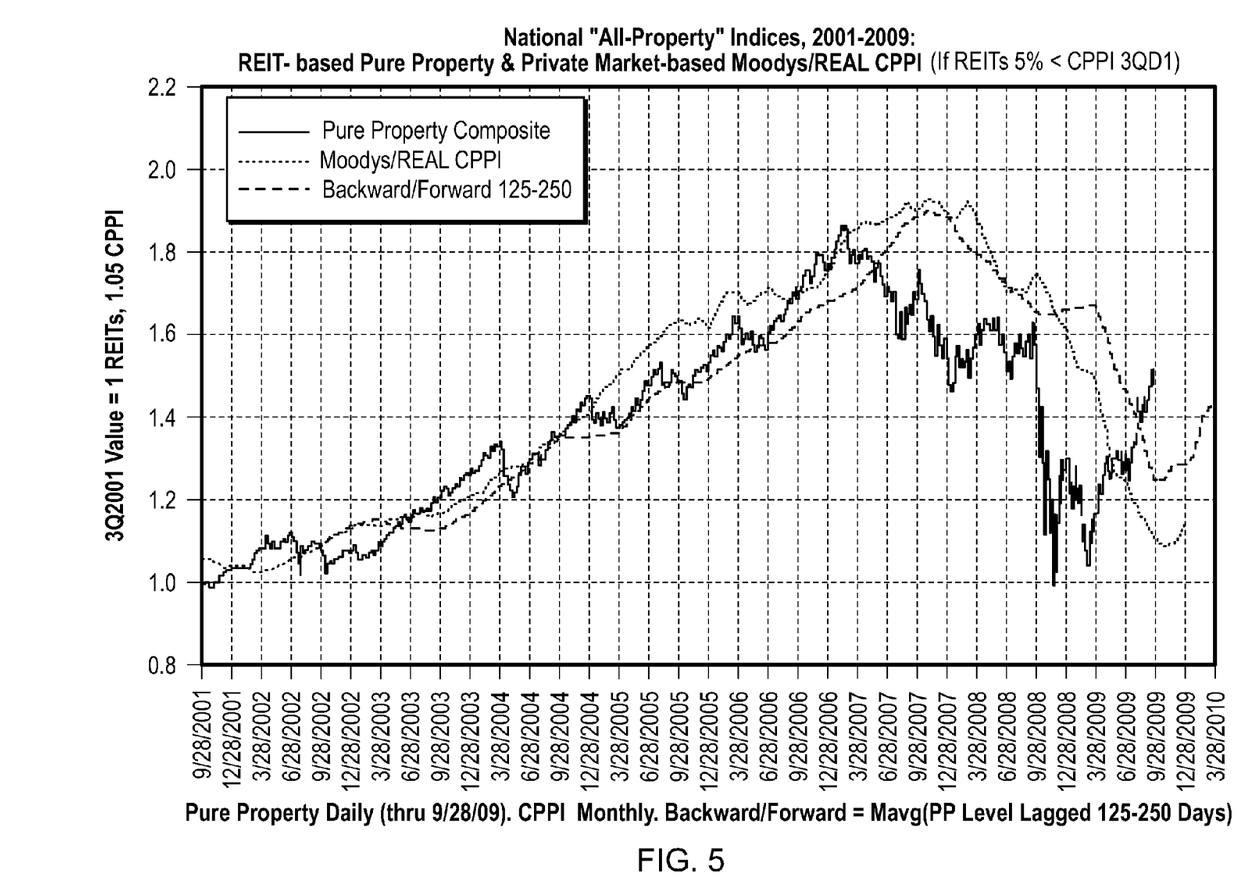
FIG. 5 is an exemplary graphical depiction of a Backward/Forward derivative contract compared with a private property market index.

Referring now to FIG. 5, an REIT-based pure property price return index for all property sectors on the national level has been generated. Further, a "Backward/Forward 125-250" lagged moving average has been applied to the index. In this case, the moving average is daily-updated and equal-weighted. Depicting the "Backward/Forward 125-250" lagged moving average against the private market-based CPPI demonstrates that the moving average of this disclosure can track the prices in a private property market.

While the invention has been particularly shown and described with reference to specific embodiments, it should be understood by those skilled in the art that various changes in form and detail may be made therein without departing from the spirit and scope of the invention as defined by the appended claims.

What is claimed is:

1. A method comprising:
   retrieving, by a processor of a computing device, a first number corresponding to a proportion of a first real estate investment trust invested in a segment of a property market;
   retrieving, by the processor, return data for the first real estate investment trust at a first period of a frequency;
   retrieving, by the processor, return data for the first real estate investment trust at a second period of the frequency;
   retrieving, by the processor, a second number corresponding to a proportion of a second real estate investment trust invested in the segment of the property market;
   retrieving, by the processor, return data for the second real estate investment trust at the first period of the frequency;
   retrieving, by the processor, return data for the second real estate investment trust at the second period of the frequency;
   processing, by the processor, the first number to obtain a first weight, the first weight corresponding to a first long position for investing in the first real estate investment trust;
   processing, by the processor, the second number to obtain a second weight, the second weight corresponding to a first short position for investing in the second real estate investment trust;
   determining, by the processor, a first value in a real estate investment trust return index based at least in part on the first weight, the return data for the first real estate investment trust at the first period of the frequency, the second weight, and the return data for the second real estate investment trust at the first period of the frequency;
   determining, by the processor, a second value in the real estate investment trust return index based at least in part on the first weight, the return data for the first real estate investment trust at the second period of the frequency, the second weight, and the return data for the second real estate investment trust at the second period of the frequency; and
   determining, by the processor, a second index based at least in part on the first value in the real estate investment trust return index and the second value in the real estate investment trust return index.

2. The method of claim 1, wherein retrieving the return data for the first real estate investment trust at the first period of the frequency comprises:
   retrieving total return data for the first real estate investment trust.

3. The method of claim 1, wherein retrieving the return data for the first real estate investment trust at the first period of the frequency comprises:
   retrieving capital return data for the first real estate investment trust.

4. The method of claim 1, further comprising:
   prior to determining the first value in the real estate investment trust return index,
      delevering, by the processor, the return data for the first real estate investment trust at the first period of the frequency, and
      delevering, by the processor, the return data for the second real estate investment trust at the first period of the frequency.

5. The method of claim 1, wherein determining the first value in the real estate investment trust index comprises:
   regressing the return data for the first real estate investment trust based at least in part on the first number to obtain the first value in the real estate investment trust return index.

6. The method of claim 1, wherein determining the first value in the real estate investment trust index comprises:
   performing constrained optimization based at least in part on the return data for the first real estate investment trust and the first number to obtain the first value in the real estate investment trust return index.

7. The method of claim 1, wherein the frequency is one of a daily basis, a monthly basis, and a yearly basis.

8. The method of claim 1, wherein determining the first value in the real estate investment trust return index comprises:
   determining the first value in a real estate investment trust total return index.

9. The method of claim 1, wherein determining the first value in the real estate investment trust return index comprises:
   determining the first value in a real estate investment trust price index.

10. The method of claim 4, wherein delevering the return data for the first real estate investment trust at the first period of the frequency comprises:
   delevering the return data for the first real estate investment trust based at least in part on a Weighted Average Cost of Capital (WACC) accounting identity.

11. The method of claim 1, wherein determining the second index comprises averaging values of the real estate investment trust return index over a window, wherein the values of the real estate investment trust return index comprise the first value and the second value.

12. The method of claim 1, wherein determining the second index comprises generating a lagged moving average of values of the real estate investment trust return index over a window, wherein the values of the real estate investment trust return index comprise the first value and the second value.

13. The method of claim 12, wherein determining the second index comprises generating the lagged moving average of the values of the real estate investment trust return index over a window of 250 to 125 weekdays prior to a day.

14. The method of claim 1, wherein determining the second index comprises averaging the real estate investment trust return index updated on a daily basis.

15. The method of claim 1, wherein determining the second index comprises equally weighting values of the real estate investment trust return index over a window, wherein the values of the real estate investment trust return index comprise the first value and the second value.

* * * * *